United States Patent
Rippstein

(10) Patent No.: US 8,226,127 B2
(45) Date of Patent: Jul. 24, 2012

(54) CLAMP FITTING FOR A PIPE

(75) Inventor: Klaus Rippstein, Ebelsbach (DE)

(73) Assignee: Uponor Innovation AB, Fristad (SE)

( * ) Notice: Subject to any disclaimer, the term of this patent is extended or adjusted under 35 U.S.C. 154(b) by 85 days.

(21) Appl. No.: 12/602,603

(22) PCT Filed: Jun. 2, 2008

(86) PCT No.: PCT/EP2008/056758
§ 371 (c)(1),
(2), (4) Date: Apr. 5, 2010

(87) PCT Pub. No.: WO2008/148728
PCT Pub. Date: Dec. 11, 2008

(65) Prior Publication Data
US 2010/0194099 A1    Aug. 5, 2010

(30) Foreign Application Priority Data
Jun. 2, 2007 (DE) .......................... 10 2007 025 931

(51) Int. Cl.
*F16L 33/00* (2006.01)

(52) U.S. Cl. .......................................... 285/23; 285/244

(58) Field of Classification Search .................. 285/244, 285/23
See application file for complete search history.

(56) References Cited

U.S. PATENT DOCUMENTS

| | | | |
|---|---|---|---|
| 4,005,884 A | 2/1977 | Drori | |
| 4,512,596 A | 4/1985 | Obrecht | |
| 4,635,966 A | 1/1987 | Hermann | |
| 5,749,603 A * | 5/1998 | Mann | 285/23 |
| 5,814,763 A | 8/1998 | Kirma | |
| 5,915,739 A | 6/1999 | Cradduck et al. | |
| 5,930,872 A * | 8/1999 | McBride et al. | 285/23 |
| 6,701,581 B2 | 3/2004 | Senovich et al. | |
| 6,726,253 B2 * | 4/2004 | Shibata et al. | 285/23 |
| 7,090,255 B2 * | 8/2006 | Clarke et al. | 285/23 |
| 7,455,324 B2 * | 11/2008 | Inoue | 285/244 |

FOREIGN PATENT DOCUMENTS

| | | |
|---|---|---|
| DE | 3313598 | 10/1983 |
| DE | 39 11 406 | 10/1990 |
| DE | 19902265 | 9/2000 |
| DE | 20 2004 017 433 | 11/2005 |
| EP | 0 849 519 | 6/1998 |
| EP | 1 22 485 | 8/2001 |
| EP | 1 122 485 | 8/2001 |
| EP | 1 662 190 | 5/2006 |
| GB | 2 286 027 | 8/1995 |
| JP | 05-231571 | 9/1993 |

* cited by examiner

*Primary Examiner* — David E Bochna

(74) *Attorney, Agent, or Firm* — Occhiuti Rohlicek & Tsao LLP

(57) ABSTRACT

The clamp fitting for a pipe, in particular, a plastic pipe or a plastic-metal composite pipe, is provided with a fitting body having a support sleeve onto which one end of a pipe to be connected can be pushed. Clamp fitting further comprises a clamping sleeve having a wall that has a slot running between its axial ends that is delimited by opposing flanks of the wall and is expandable, wherein clamping sleeve surrounds support sleeve and end of the pipe to be connected in the state when it has been pushed onto the support sleeve. To maintain the expanded state of clamping sleeve, a removable spacer, against which flanks of the wall that delimit slot of the expanded clamping sleeve are supported, is arranged in slot.

19 Claims, 4 Drawing Sheets

CLAMP FITTING FOR A PIPE

CROSS-REFERENCE TO RELATED APPLICATIONS

This application is the National Stage of International Application No. PCT/EP2008/056758, filed on Jun. 2, 2008, which claims the priority of German Patent Application No. 10 2007 025 931.1, filed on Jun. 2, 2007. The contents of both applications are hereby incorporated by reference in their entirety.

BACKGROUND OF THE INVENTION

The invention relates to a clamp fitting for a pipe, in particular, a clamp fitting for a plastic pipe or a plastic-metal composite pipe.

Such clamp fittings are sufficiently familiar from the prior art, and have a fitting body that is furnished with a support sleeve onto which the end of a pipe to be connected can be pushed. On the outside, around the connection end of the pipe that is pushed onto the support sleeve, there is a sleeve that is radially compressed with the aid of a pressing tool and thus presses the connection end of the pipe into the support sleeve, whereby the required tightness on the one hand, and a strain relief on the other, are created.

This press-fitting technique has proven itself in practice and is used particularly for the connection of plastic pipes or plastic-metal composite pipes.

To avoid using pressing tools, it was already proposed in the past that a clamping or locking sleeve be used in place of a crimping sleeve. This is described in DE-C-3911406. For pressing the connection end of the pipe against the support sleeve in this known clamp fitting, a slotted, expanded clamping sleeve made of metal is used, which presses the connection end of the pipe against the support sleeve with sufficient pressing force because of its elastic recovery capability as a result of the expanding. In the installation of the known clamping sleeve, it is necessary to use a spreading tool with which the clamping sleeve is held in the expanded position when it is pushed onto the connection end of the pipe that is pushed onto the support sleeve.

In addition, a fixing element for fixing flexible protective tubes that has a resilient clamping sleeve producing a bias force by radial pressure for fixing a support tube is known from EP-A-0 849 519. The clamping sleeve can be expanded by means of a tool.

BRIEF SUMMARY

The problem of the invention is to create a clamp fitting for a pipe, in particular, a plastic pipe or a plastic-metal composite pipe, in which the pressing force acting on the pipe to be connected is applied without using a pressing tool, and in which the installation of the clamping sleeve is simplified.

To solve this problem, the invention proposes a clamp fitting for a pipe, particularly a plastic pipe or a plastic-metal composite pipe that is provided with a fitting body having a support sleeve onto which one end of a pipe to be connected can be pushed, and a clamping sleeve having a wall that has a slot running between its axial ends that is delimited by opposing flanks of the wall and is expandable, wherein the clamping sleeve surrounds the support sleeve and the end of the pipe to be connected in the state when it has been pushed onto the support sleeve.

To maintain the expanded state of the clamping sleeve according to the invention for this clamp fitting, it is proposed that a removable spacer, against which the flanks of the wall delimiting the slot of the expanded clamping sleeve are supported, be arranged in the slot.

The clamp fitting according to the invention comprises a locking or clamping sleeve having at least one slot that runs between the axial ends of the clamping sleeve. As a result of the slot, the clamping sleeve, which normally consists of or comprises metal, can be expanded, wherein the clamping sleeve deforms elastically and creates a restoring force which is then used for pressing the connection end of the pipe against the support sleeve when the clamping sleeve surrounds the connection end of the pipe that has been pushed onto the support sleeve of the fitting body. In this case, the clamping sleeve thus takes over the function of the crimping tool or the crimping sleeve, so to speak.

According to the invention, it is proposed that the clamping sleeve be maintained in its expanded state by arranging a spacer in the slot, wherein the flanks of the wall of the expanded support sleeve that bound the slot rest against the spacer. The spacer simplifies the handling and installation of the clamping sleeve quite considerably, since the clamping sleeve automatically remains in its expanded state without being manipulated by a spreading tool. The spacer can be inserted into the slot of the clamping sleeve at the factory, or it can be placed into the sleeve by the installer for installation of the clamping sleeve.

The spacer can advantageously be removed from the slot of the clamping sleeve by means of a tool in order to "release" the clamping sleeve. Alternatively, it is possible for the spacer to have a handling element for manual removal of the spacer from the slot of the clamping sleeve. A suitable handling element, for example, is a ring element that is connected to the spacer or formed integrally with the spacer. Other elements that can be grasped, such as hook elements or the like, can likewise be provided on the spacer to enable removing it manually from the slot of the clamping sleeve.

In place of a manual removal of the spacer or a removal by a tool, it is possible for the spacer to be automatically removed from the slot during the installation of the clamping sleeve or during the connection of the pipe. For this purpose, it is proposed in a first variant of the invention that the fitting body have an ejector element against which and/or via which the spacer can be moved out of the slot while pushing the expanded clamping sleeve over the end of the pipe to be connected that is situated on the support sleeve. In this variant, the fitting body has an ejector element against which the spacer runs when the expanded sleeve is pushed on, and which is deflected by the ejector element substantially in the radial direction of the clamping sleeve and is thus "ejected."

In a second variant for the automatic removal of the spacer from the slot of the clamping sleeve during installation of the fitting, it is proposed that the spacer have a releasing section projecting above, protruding from the inner side of the wall of the clamping sleeve, and that to move the spacer out of the slot of the clamping sleeve, the end of the pipe to be connected can be moved against the releasing section of the spacer while being pushed onto the support sleeve and the clamping sleeve surrounding it. In this case, the clamping sleeve can be premounted in the expanded state on the fitting body. If the pipe end to be connected is pushed into the area between the clamping sleeve and the support sleeve, it contacts the releasing section of the spacer, since this releasing section projects into the annular space between the clamping sleeve and the support sleeve, at the end of this annular space, into which the pipe end moves shortly before it has been completely inserted into the annular space.

To improve the purchase of the clamping sleeve on the connection end of the pipe, the inner side of the clamping sleeve can be textured, which can be realized by a sawtooth profile, bumps or a roughened surface.

The clamping sleeve advantageously has a material, or a wall thickness, selected in such a manner that after removal of the elastic expansion of the clamping sleeve, it presses the end of the pipe to be connected against the support sleeve in a sealing and tension-relieving manner. Metals and metal alloys are suitable as materials, for example. In particular, so-called superplastic materials (particularly metallic materials) such as shape memory alloys should be considered for this. An example of a superplastic alloy is a NiTi alloy such as Nitinol. Superplastic materials are distinguished by a force versus displacement characteristic curve with a plateau, which describes a force-displacement profile in which the force remains constant over a part of the path.

For the handling of the clamp fitting according to the invention, it is additionally advantageous if the clamping sleeve is held in the expanded state on the fitting body, making possible a contraction with the spacer removed.

The spacer can additionally serve to designate that the clamp fitting is pressed in. As soon as the spacer is no longer present, the clamping sleeve presses against the support sleeve in a sealing and strain-relieving manner. The (clamping) fitting is thus "pressed-in." The spacer should therefore be easily recognizable from a distance, so that one can reliably assume, if one does not discern a spacer, that the clamping sleeve has been released, i.e., that it is clampingly seated on the end of the pipe to be connected and presses it against the support sleeve.

The clamping sleeve generally has a centric, elliptical or other annular structure.

The end of the pipe should be pressed by the crimping sleeve against the support sleeve over a range of 360° in every radial plane. Inside the slot, however, there is no or only very little pressing, particularly if the material of the pipe is crushed. It is advantageous in that respect for the slot to have a corrugated or sinusoidal curve along the axial extent of the crimping sleeve. Thereby the circumferential areas of the pipe end in which it is pressed less strongly against the support sleeve because of the open slot in the pressed-in state are circumferentially offset relative to one another in adjacent radial planes along the axial extent of the crimping sleeve.

The specifics of the clamp fitting according to the invention will be repeated below as follows.

The clamping sleeve of the clamp fitting is self-locking and takes over the five functions that a crimping sleeve has after crimping.

1. In the simplest case, the clamping sleeve is produced as a tubular body. In the simplest design, the clamping sleeve has a centric or elliptical cross section. The internal geometry of the clamping sleeve should be chosen to correspond to the external diameter of the pipe to be connected. In the expanded state, there can be a loose fit or a transition fit to the pipe to be connected. After the clamping sleeve has been pushed onto the connection end of the pipe, its slot should not be completely closed, since that limits the pressing force against the end of the pipe to be connected. The interior profile of the clamping sleeve can also be provided with contours (for example, a sawtooth profile or bumps) and/or with a roughened surface.

2. The axial length of the clamping sleeve should be chosen to correspond to the lengths of typical modern crimping sleeves.

3. The thickness of the wall should likewise be chosen suitably, depending on the material and the necessary pressing force.

4. The material of the clamping sleeve (preferably metal) is advantageously sufficiently corrosion-resistant and/or coated.

5. The clamping sleeve of the clamp fitting according to the invention is slotted at least one time at an angle between 0° and 85° relative to the longitudinal axis. The slotting can also be made as a thread/spiral groove with an essentially arbitrary pitch and can be made with single or multiple threads. The clamping sleeve wall can be completely and/or partially penetrated. The penetration takes place inside an angular range between 90° with respect to the clamping sleeve surface (parallel to the longitudinal axis) and a limit angle >0°, which in a certain tubular body also leads to the production of a usable contour. The contour of the penetration (slotting) in the radial direction can be implemented with any desired slope or flank angles. In an advantageous embodiment, the flank angle can lie in the range in which parts self-lock, the inclined flank angle being chosen in such a manner that the width of the slot enlarges from the interior side to the exterior side of the clamping sleeve. The contour of the penetration (slotting) in the axial direction can run from uniform width (the simplest case would be a straight slot) to arbitrarily structured designs (e.g., corrugated with and without undercutting). In all of this, it must be noted that, as a consequence of the extent and orientation of the slot, a clamping sleeve results that has a larger elasticity in the radial direction than in the axial direction, thus having a greater rigidity in the axial direction than in the radial direction.

6. According to the invention, the previously described clamping sleeve is held in the radially expanded state with the aid of the spacer.

7. Examples of spacers are a metallic prism (partial blocks or the like), but also elements with and without intrinsic elasticity. Elements with radii, for example, round or tubular elements, are also conceivable as spacers. The length of the spacer is arbitrary in principle, but should not be longer than the slot length. The spacer and the above-described embodiments of the slot contour form a functional unit with the objective of operational reliability.

8. The unit consisting of clamping sleeve and spacer can be mounted on the fitting body by means of an intermediate piece (holder or the like). For instance, this could be a plastic ring that is mounted on the fitting body on the one hand, and on the other accommodates the expanded clamping sleeve, i.e., impinges on the clamping sleeve externally. Cutouts for monitoring the insertion depth of the pipe can also be provided here. In this way, the fitting body, including the support sleeve, can be simpler in design.

9. It is likewise possible to supply the fitting body and the clamping sleeve separately, i.e., not preassembled.

10. For installation, the pipe end to be connected (with an expanded clamping sleeve pre-mounted on the fitting body) is inserted into the annular space between the support sleeve and the clamping sleeve. After the required insertion depth of the pipe has been reached, the spacer is drawn outward out of the sleeve slot by means of a tool or manually. As a result, the clamping sleeve springs back and presses the pipe against the support sleeve. The pressing force suffices to achieve both fluid-tightness and a security against being pulled off.

11. The concept of the clamp fitting according to the invention also provides an integrated "pressed-in marker." If the spacer is missing, the connection has been "pressed-in."
12. Alternatively to the removal of the spacer by manual intervention or by using a tool, it is also possible to perform the installation without tools. In this case, the spacer can be ejected by the pipe end to be connected when it is inserted. This can be achieved, for example, by forming the spacer in the area in which it is contacted by the pipe.

The spacer can have radii or slanted surfaces in this area. The end face of the pipe runs against these radii or slanted surfaces, whereby the spacer is raised and "ejected." A detached provision of the clamping sleeve is advantageous for achieving this effect. Installation is then performed by pushing the connection sleeve onto the pipe end to be connected, whereupon the two are pushed together onto or over the support sleeve. A matching opposing contour, which serves as a stop for the spacer when the pipe end and the clamping sleeve are pushed on, can now be provided on the fitting body. When the spacer runs up against this stop, the spacer is raised and thereby moved out of the slot.

DESCRIPTION OF THE DRAWINGS

The invention will be described below in detail based on several embodiments and with reference to the drawing. In detail.

DETAILED DESCRIPTION

Figure 1:
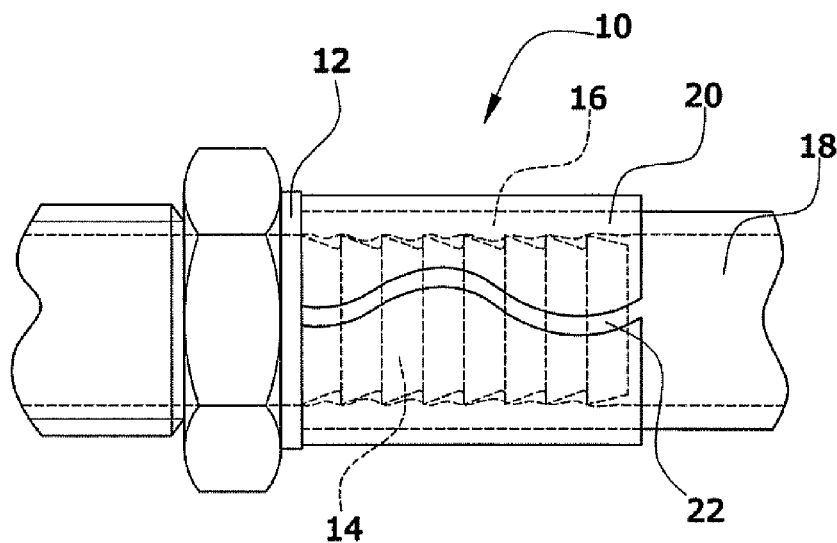
FIG. 1 shows a side view of a first embodiment of a clamp fitting with a clamping sleeve clampingly seated on the pipe end to be connected, FIG. 2, a variant of a clamping sleeve with a slot running obliquely to the longitudinal axis, FIGS. 3-5, cross sections through various clamping sleeves to illustrate differently oriented and shaped slots as well as differently textured interior surfaces of the clamping sleeve, FIGS. 6-10, cross sections of additional embodiments of clamping sleeves for representing the various possible forms of spacers for maintaining the expanded state of the clamping sleeve, FIGS. 11 and 12, longitudinal sections through slotted clamping sleeves kept in the expanded state by spacers, wherein the spacers can be removed from the slots with the aid of tools, FIGS. 13 and 14, half cross sections and side views of another embodiment of a clamp fitting with a spacer automatically removable during installation, FIGS. 15 and 16, another embodiment of a clamp fitting in longitudinal section and in side view, wherein the spacer is automatically ejected during insertion of the pipe, and FIG. 17, a final embodiment of a clamp fitting in longitudinal section with a spacer automatically moving out of the clamping sleeve slot during insertion of the pipe.

A number of different embodiments of the clamp fitting of the clamping sleeve and the spacer are shown in the drawing. Insofar as the components of the clamp fitting shown in the drawings are functionally or constructively identical, they are provided with identical reference numbers.

FIG. 1 shows an embodiment of a clamp fitting 10 in the installed state. Clamp fitting 10 has a fitting body 12 that is furnished with a support sleeve 14. This support sleeve 14 can be profiled on its exterior and/or have a seal element (e.g., an O-ring). The end 16 of a pipe 18 to be connected is pushed onto the support sleeve. This connection end 16 is in turn enclosed by a slotted clamping sleeve 20, which has a sinuous slot 22 in this embodiment. Clamping sleeve 20 was pushed in the expanded state onto connection end 16 of pipe 18, for which purpose a spacer 24 was inserted into slot 22 of clamping sleeve 20, as is shown for example in FIGS. 6-17.

Figure 2:
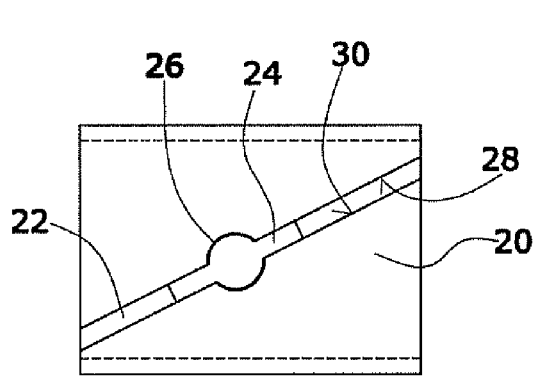

FIG. 2 shows an additional embodiment of the clamping sleeve 20 with an oblique slot 22 and a spacer 24 arranged therein, that is constructed corresponding to an expanded section 26 in slot 22. Slot 22 is formed by flanks 28, 30 of the wall of clamping sleeve 20. Spacer 24 rests against flanks 28, 30 and keeps them apart, i.e., keeps clamping sleeve 20 in the expanded state.

Figure 3:
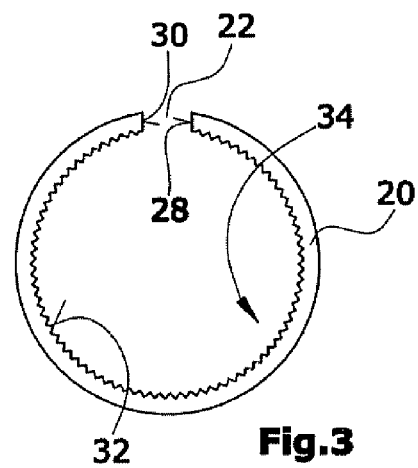
Figure 4:
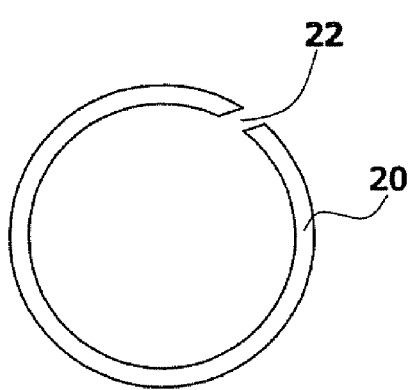
Figure 5:
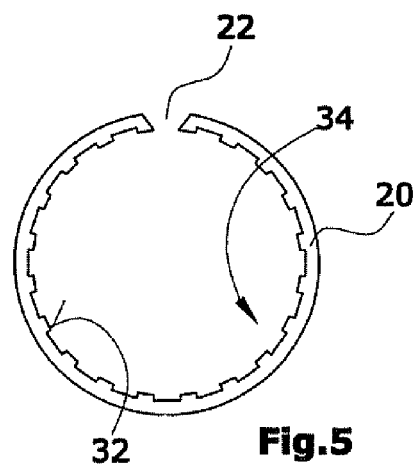
Figure 6:
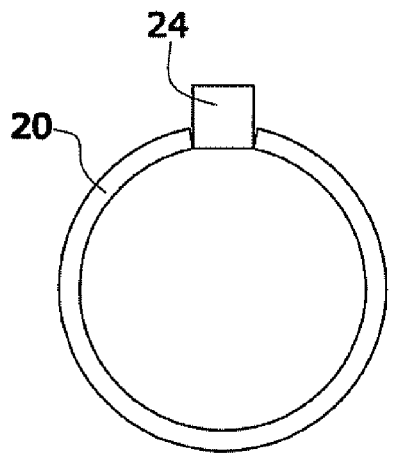

FIGS. 3-5 show various embodiments of slot 22. Thus, slot 22 of clamping sleeve 20 of FIG. 3 is oriented substantially radially and has flanks 28, 30 running substantially parallel to one another. In the embodiment of clamping sleeve 20 in accordance with FIG. 4, slot 22 runs at an angle to the radial extension of clamping sleeve 20. In FIG. 5, slot 22 is expanded outward. In addition, FIGS. 3 and 4 show different surface contours 32 on the inside 34 of clamping sleeve 20. In this way, an increased security of clamping sleeve 20 against axial displacement relative to connection end 16 of pipe 18 can be achieved.

Figure 7:
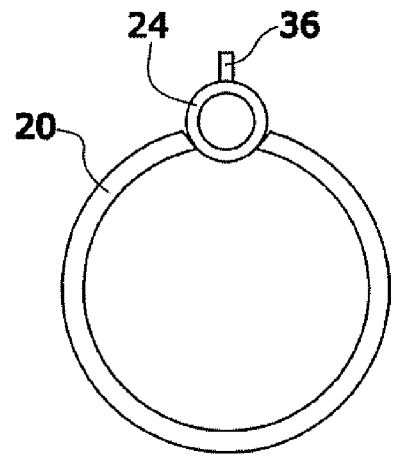
Figure 8:
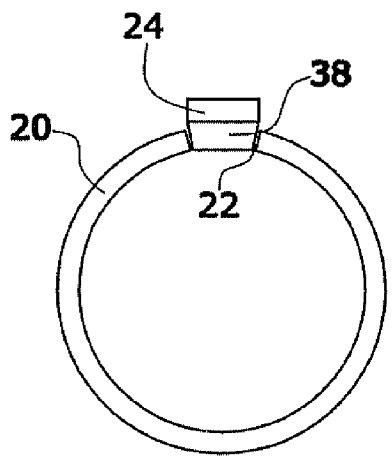
Figure 9:
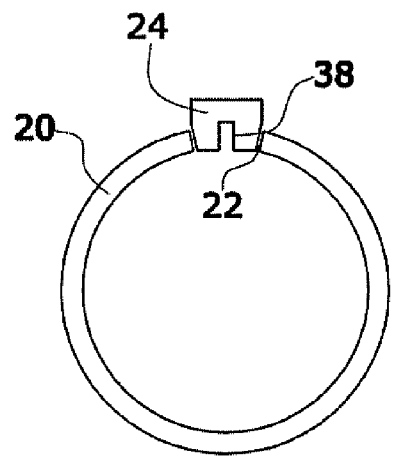
Figure 10:
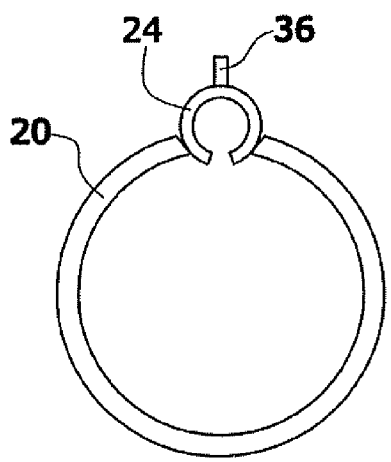

In FIGS. 6-10, various spacers 24 for maintaining the expansion of clamping sleeve 20 are shown. In the embodiment in accordance with FIG. 6, spacer 24 is shown with a rectangular cross section. FIG. 7 shows a spacer 24 with a round contour and a handle or handling member 36 for grasping spacer 24 with the aid of a tool for removing spacer 24 from slot 22. FIG. 8 shows a spacer 24 with a wedge-shaped section 38, where this wedge shape is matched to the wedge shape of slot 22. In FIGS. 9 and 10, spacers 24 each have resilient properties.

Figure 11:
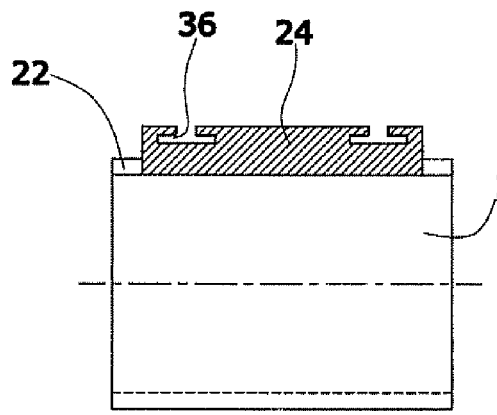
Figure 12:
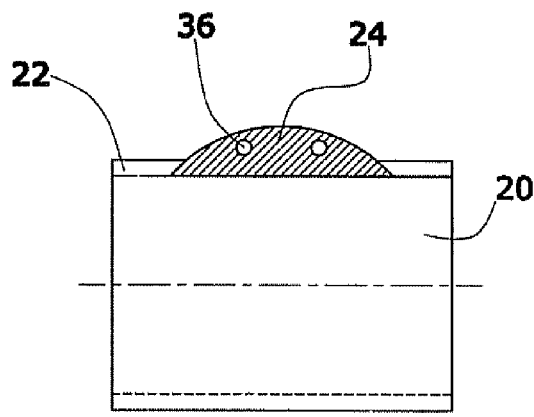

FIGS. 11 and 12 show two clamping sleeves 20 with spacers 24 in their slots 22, the spacers in this embodiment having handling members 36 in the form of cutouts that allow the engagement of tools for pulling spacer 24 out of slots 22.

Figure 13:
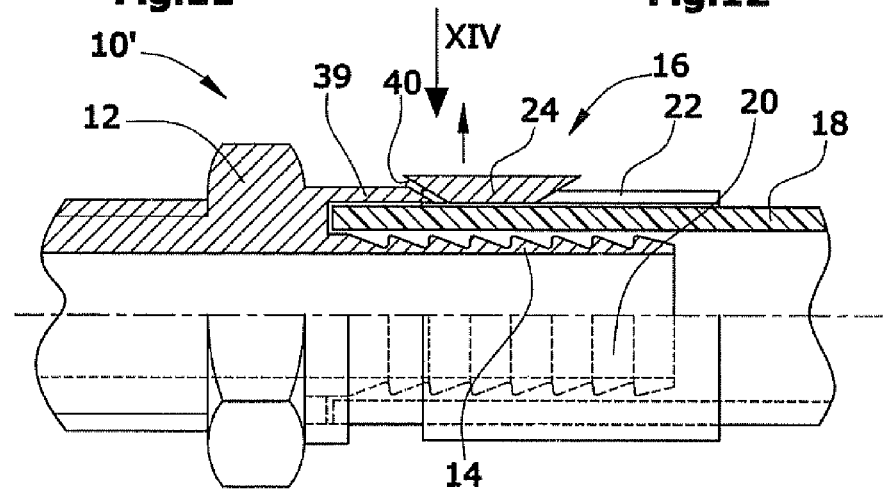
Figure 14:
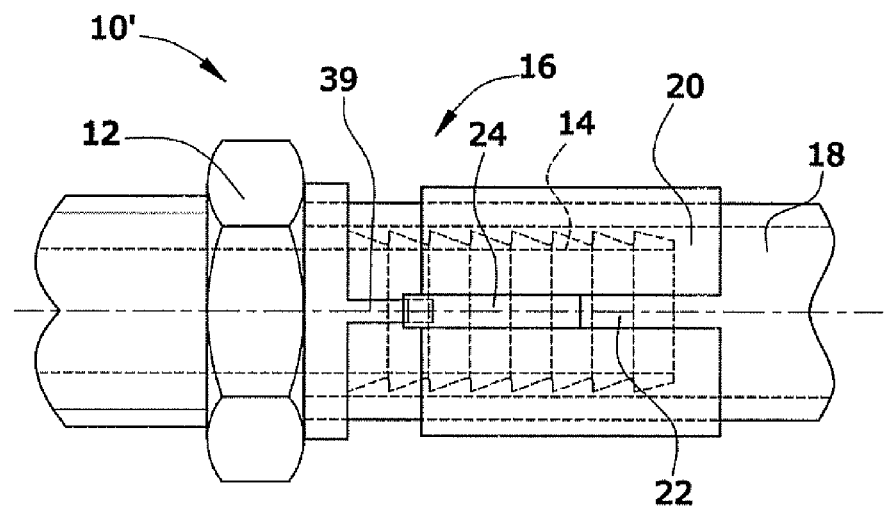

FIGS. 13 and 14 show an embodiment of a clamp fitting 10' in which spacer 24 of clamping sleeve 20 is automatically removed when clamping sleeve 20 is pushed over connection end 16 of pipe 18 and over support sleeve 14. For this purpose, an ejector protrusion 39, against which a slanted surface of 40 of spacer 24 strikes when clamping sleeve 20 is pushed in the direction of the ejector protrusion 39, is formed on fitting body 12. FIG. 14 shows the situation or the design of this clamp fitting 10' in the direction of arrow 14 of FIG. 13.

Figure 15:
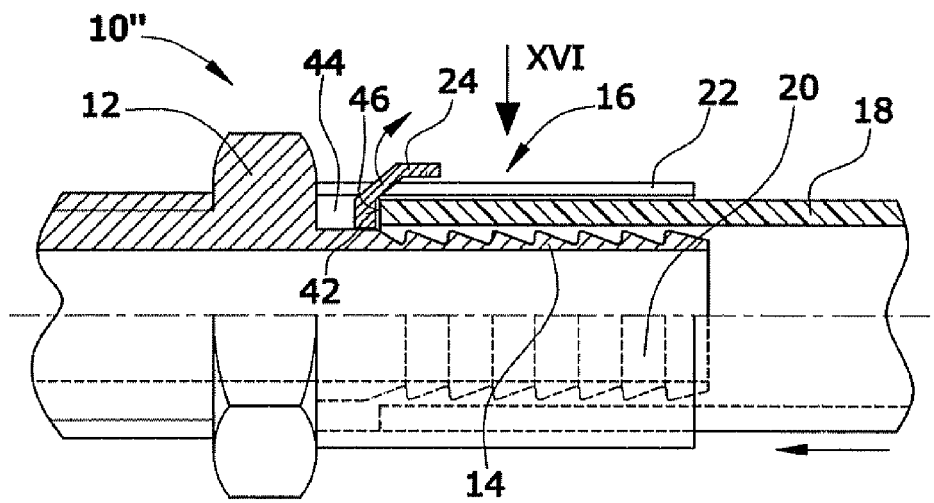
Figure 16:
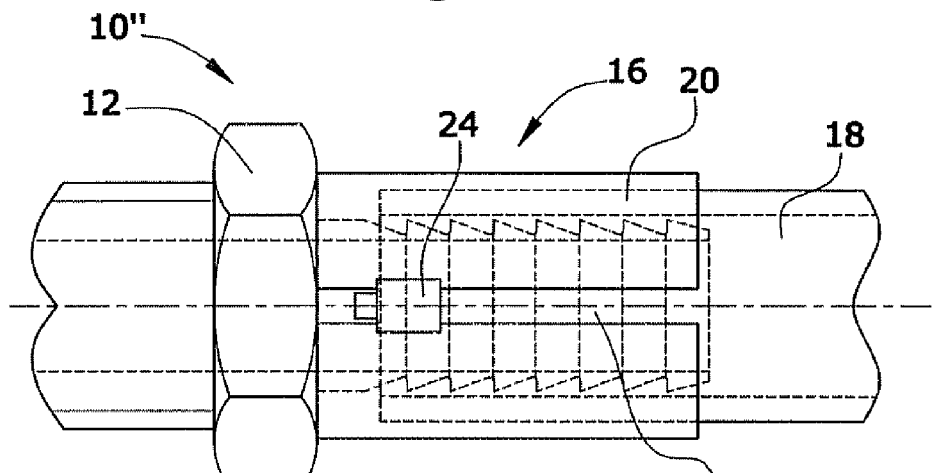

FIGS. 15 and 16 show another embodiment of a clamp fitting 10", in which spacer 24 is ejected by pipe 18 when pipe 18 is close to its maximum insertion position. Spacer 24 here has a releasing section 42 that projects into the annular space 44 between clamping sleeve 20 and support sleeve 14. End face 46 of connection end 16 of pipe 18 then presses against releasing section 42 of spacer 24, which thus twists out of the slot of sleeve 20 to the outside.

Figure 17:
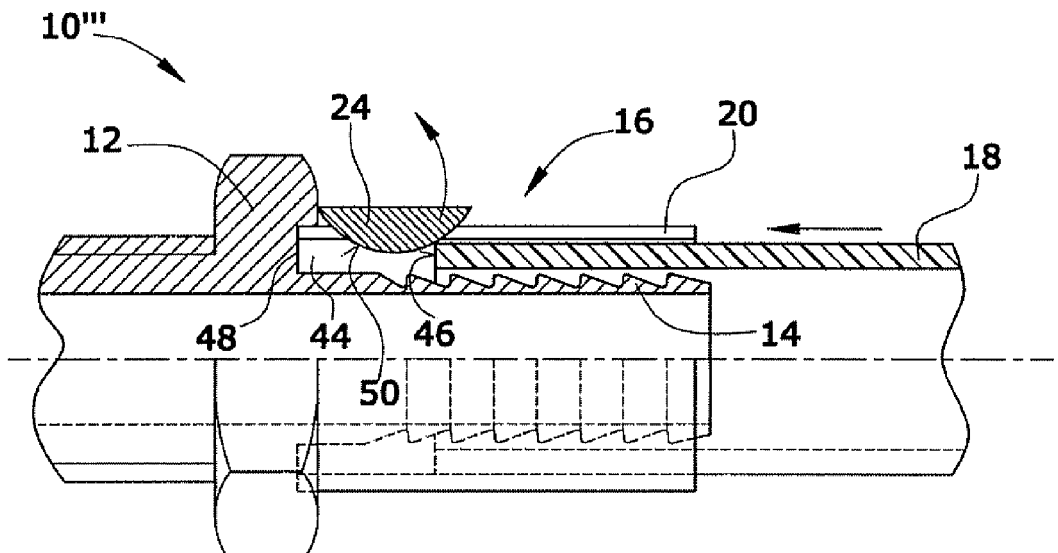

FIG. 17 shows an embodiment of a clamp fitting 10 in which clamping sleeve 20 is held in the expanded state on fitting body 12. For this purpose, fitting body 12 has an annular recess 48 that is open toward the free end of support sleeve 14 and clampingly surrounds clamping sleeve 20. Spacer 24, which has a round section 50 on its underside facing support sleeve 14, is situated in the slot of clamping sleeve 20. In this round section, spacer 24 projects into the annular space 44 between clamping sleeve 20 and support sleeve 14. When the pipe is inserted, end face 46 of pipe 18 presses from below against spacer 24 via round section 50, so that it twists around outward out of the slot, thus releasing clamping sleeve 20, and clamping sleeve 20 can accordingly exert its clamping force onto connection end 16 of pipe 18.

The invention claimed is:

1. A clamp fitting for a pipe, the clamp fitting comprising:
   a fitting body having a support sleeve configured to be inserted into one end of the pipe;
   a clamping sleeve having a wall that has a slot running between its axial ends and that is delimited by opposing flanks of the wall and is expandable, wherein the clamping sleeve is configured to accept the end of the pipe with the support sleeve inserted therein, and the slot forms a spiral, a corrugated or a sinusoidal curve along the axial extent of the clamping sleeve; and
   a removable spacer configured to be arranged in the slot of the clamping sleeve, such that an expanded state of the clamping sleeve is maintained by the removable spacer by supporting the flanks of the wall that delimit the slot of the expanded clamping sleeve.

2. The clamp fitting according to claim 1, wherein the spacer is removable from the slot of the clamping sleeve by means of a tool.

3. The clamp fitting according to claim 1, wherein the spacer has a releasing section projecting past the wall of the clamping sleeve on its inner side, and when pushed onto the support sleeve, and with the clamping sleeve surrounding the support sleeve, the end of the pipe to be connected can be moved against the releasing section of the spacer to move the spacer out of the slot of the clamping sleeve.

4. The clamp fitting according to claim 1, wherein the clamping sleeve has a textured inner side.

5. The clamp fitting according to claim 1, wherein the clamping sleeve includes a material, and/or the wall of clamping sleeve has a thickness, such that after the elastic expansion of the clamping sleeve has been ended, the clamping sleeve presses the end of the pipe to be connected in a sealing and strain-relieving manner against the support sleeve.

6. The clamp fitting according to claim 1, wherein the clamping sleeve is retained in the expanded state on the fitting body, allowing a contraction with the spacer removed.

7. The clamp fitting according to claim 1, wherein
   the spacer has a marker section that is arranged and recognizable from the outside of the wall of the clamping sleeve, and
   the spacer is arranged such that when the removable spacer is removed, the clamping sleeve presses against the support sleeve in a sealing and strain relieving manner, the absence of the removable spacer indicating that the clamp fitting is pressed in.

8. The clamp fitting according to claim 1, wherein the clamping sleeve has a substantially cylindrical, elliptical or other annular structure.

9. The clamp fitting of claim 1, wherein the clamp fitting comprises a shape memory alloy.

10. A clamp fitting for a pipe, the clamp fitting comprising:
    a fitting body having a support sleeve configured to be inserted into one end of the pipe;
    a clamping sleeve having a wall that has a slot running between its axial ends and that is delimited by opposing flanks of the wall and is expandable, wherein the clamping sleeve is configured to accept the end of the pipe with the support sleeve inserted therein; and
    a removable spacer configured to be arranged in the slot of the clamping sleeve, such that the expanded state of the clamping sleeve is maintained by the removable spacer by supporting the flanks of the wall that delimit the slot of the expanded clamping sleeve, wherein the removable spacer has a handling member for manual removal of the removable spacer from the slot, the handling member including at least one handling cutout that allows the engagement of a tool for pulling the spacer out of the slot.

11. The clamp fitting of claim 10, wherein the slot forms a spiral, a corrugated or a sinusoidal curve along the axial extent of the clamping sleeve.

12. A clamp fitting for a pipe, the clamp fitting comprising:
    a fitting body having a support sleeve configured to be inserted into one end of the pipe;
    a clamping sleeve having a wall that has a slot running between its axial ends that is delimited by opposing flanks of the wall and is expandable, wherein the clamping sleeve is configured to accept the end of the pipe with the support sleeve inserted therein; and
    a removable spacer configured to be arranged in the slot of the clamping sleeve, such that the expanded state of the clamping sleeve is maintained by the removable spacer by supporting the flanks of the wall that delimit the slot of the expanded clamping sleeve;
    wherein the fitting body has an ejector element adapted for moving the spacer out of the slot when the end of the pipe with the support sleeve inserted therein is accepted by the expanded clamping sleeve.

13. The clamp fitting of claim 12, wherein the slot forms a spiral, a corrugated or a sinusoidal curve along the axial extent of the clamping sleeve.

14. The clamp fitting according to claim 12, wherein the clamping sleeve has a textured inner side.

15. The clamp fitting according to claim 12, wherein the clamping sleeve includes a material, and/or the wall of the clamping sleeve has a thickness, such that after the elastic expansion of the clamping sleeve has been ended, the clamping sleeve presses the end of the pipe to be connected in a sealing and strain-relieving manner against the support sleeve.

16. The clamp fitting according to claim 12, wherein the clamping sleeve is retained in the expanded state on the fitting body, allowing a contraction with the spacer removed.

17. The clamp fitting according to claim 12, wherein
    the spacer has a marker section that is arranged and recognizable from the outside of the wall of the clamping sleeve, and
    the spacer is arranged such that when the removable spacer is removed, the clamping sleeve presses against the support sleeve in a sealing and strain relieving manner, the absence of the removable spacer indicating that the clamp fitting is pressed in.

18. The clamp fitting according to claim 12, wherein the clamping sleeve has a substantially cylindrical, elliptical or other annular structure.

19. The clamp fitting according to claim 12, wherein the opposing flanks of the slot in the radial direction have an inclined flank angle, such that the width of the slot enlarges from the interior side to the exterior side of the clamping sleeve.

* * * * *